United States Patent
Seth-Smith

(10) Patent No.: US 7,321,397 B2
(45) Date of Patent: Jan. 22, 2008

(54) COMPOSITE COLOR FRAME IDENTIFIER SYSTEM AND METHOD

(75) Inventor: Nigel James Seth-Smith, Lymington (GB)

(73) Assignee: Gennum Corporation (CA)

( * ) Notice: Subject to any disclaimer, the term of this patent is extended or adjusted under 35 U.S.C. 154(b) by 439 days.

(21) Appl. No.: 10/935,875

(22) Filed: Sep. 8, 2004

(65) Prior Publication Data

US 2005/0052575 A1 Mar. 10, 2005

Related U.S. Application Data

(60) Provisional application No. 60/502,036, filed on Sep. 10, 2003, provisional application No. 60/501,792, filed on Sep. 10, 2003, provisional application No. 60/502,028, filed on Sep. 11, 2003, provisional application No. 60/502,128, filed on Sep. 11, 2003.

(51) Int. Cl.
*H04N 5/08* (2006.01)

(52) U.S. Cl. ................ 348/527; 348/505; 348/194; 348/508

(58) Field of Classification Search ........ 348/180, 348/194, 505–508, 526, 527
See application file for complete search history.

(56) References Cited

U.S. PATENT DOCUMENTS

| | | | |
|---|---|---|---|
| 3,819,859 A | 6/1974 | Borsuk et al. | |
| 4,097,896 A | 6/1978 | Avery | |
| 4,233,629 A | 11/1980 | Dayton | |
| 4,675,722 A | 6/1987 | Hackett | |
| 4,680,633 A | 7/1987 | Gerdes et al. | |
| 4,882,624 A | 11/1989 | Sumiyoshi | |
| 4,970,581 A * | 11/1990 | O'Gwynn | 348/527 |
| 5,012,327 A * | 4/1991 | Bishop | 348/527 |
| 5,068,717 A * | 11/1991 | Jenison | 348/527 |
| 5,260,790 A | 11/1993 | Takayama | |
| 5,432,559 A | 7/1995 | Bruins et al. | |
| 5,486,869 A | 1/1996 | Cooper | |
| 5,754,250 A | 5/1998 | Cooper | |
| 5,953,069 A | 9/1999 | Bruins et al. | |
| 6,038,276 A * | 3/2000 | Dinh | 375/376 |
| 6,154,256 A | 11/2000 | Bruins | |
| 6,522,366 B1 * | 2/2003 | Onodera et al. | 348/638 |

FOREIGN PATENT DOCUMENTS

EP 0808062 B1 10/2002

OTHER PUBLICATIONS

Yu, Joseph, "Input Clock Generator (ICG 7051-1)—Preliminary Circuit Description and Test Procedures", Sep. 1977, pp. 23-26 with 42 pages of diagrams/drawings.
SCB-200N Schemicatic Diagram, Jun. 30, 1993, 6 diagrams.
Gennum Corporation, GS4882; GS4982 Video Sync Separators with 50% Sync Slicing Data Sheet, Jul. 2004, 7 pages.

(Continued)

*Primary Examiner*—Victor R. Kostak
(74) *Attorney, Agent, or Firm*—Jones Day

(57) ABSTRACT

A color frame identifier circuit generates a pseudo-subcarrier signal and compares the pseudo-subcarrier signal to a sliced color burst of at least one selected line in a video frame. Based on this comparison, a processing circuit determines the color frame.

19 Claims, 5 Drawing Sheets

OTHER PUBLICATIONS

Leitch, "DTG-1000N Digital Test Generator-Instruction Manual", pp. 1-15 with 29 pages diagrams/drawings.

The Grass Valley Group Inc., "Data Package, 9505 Color Black Sync Pulse Generator Module", Issue No. 1, 23 pages (includes drawings/diagrams).

The Grass Valley Group Inc., "SCB-200N Sync/Color Bar Generator" Maunal No. TP7034-00-Issue No. 1, 9 pages.

"Input Sync Separator" ISS, BD4-A, 11 pages (includes drawings/diagrams).

National Semiconductor, LM1881, LM1881-X Video Sync Separator, Jun. 2003, pp. 1-12.

Intersil, Sync Separator, 50% Slice, S-H Filter, H out, Aug. 15, 2002, pp. 1-9.

Intersil, Sync Separator, 50% Slice, S-H Filter, Aug. 16, 2002, pp. 1-9.

Gennum Corporation, GS1881, GS4881, GS4981, Monolithic Video Sync Separators Data Sheet, Jul. 2004, pp. 1-14.

Leitch, DTG-1000N Digital Test Generator-Instruction Manual, 40 pages (includes drawings/diagrams).

Leitch 1000 GG Schematic 1981, 3 pages.

ICG Digital Video Systems 7051, 1979, 2 pages.

Digital Video Systems, DPS-1 Operators Manual, 555 pages.

Digital Video Systems Master Manual, Aug. 1976, 272 pages.

\* cited by examiner

COMPOSITE COLOR FRAME IDENTIFIER SYSTEM AND METHOD

This application claims the benefit of U.S. Provisional Application Ser. No. 60/502,036, entitled "Digital Windowing For Video Sync Separation," filed on Sep. 10, 2003; Ser. No. 60/501,792, entitled "Composite Color Frame Identifier System And Method," filed on Sep. 10, 2003; Ser. No. 60/502,028, entitled "Video Signal Sync Separator System And Method"; filed on Sep. 11, 2003; and Ser. No. 60/502,128, entitled "Video Signal Format Detector And Generator System And Method," filed on Sep. 11, 2003. The entire disclosures of Application Ser. Nos. 60/502,036, 60/501,792, 60/502,028, 60/502,128 are incorporated herein by reference.

CROSS-REFERENCE TO RELATED APPLICATIONS

This application is related to co-pending United States Nonprovisional Application Ser. No. 10/939,095, entitled "Video Signal Format Detector And Generator System And Method," filed on Sep.10, 2004, now U.S. Pat. No. 6,972,803; and 10/935,874, entitled "Digital Windowing For Video Sync Separation," filed on Sep. 8, 2004, the entire disclosures of which are incorporated herein by reference.

BACKGROUND AND SUMMARY

This application generally relates to television signal processing systems and methods, and particularly relates to color frame processing systems and methods.

In many composite video signals, such as NTSC or PAL video signals, for example, color is provided by a color frame. The color frame is usually provided via a frame sequence, such as an odd-even sequence for an NTSC video signal. The color frame is needed to fully synchronize, or Genlock, one composite signal to another. Thus, a video processing circuit that is analyzing the composite video signal needs to identify the color frame sequence, as well as other timing characteristics.

Disclosed herein is a color frame identifier circuit that generates a pseudo-subcarrier signal and compares the pseudo-subcarrier signal to a sliced color burst of at least one selected line in a video frame over successive video frames. Based on this comparison, a processing circuit determines the color frame.

DETAILED DESCRIPTION

A video signal is typically provided as a series of video lines that comprise a video frame. Each video line comprises an active line portion and a blanking portion. The active line portion comprises picture information that is displayed on a display device. The blanking portion includes other video processing signals such as synchronization information in the form of synchronization (sync) pulses and color information in the form of a color burst.

The color burst comprises a number of cycles transmitted on a back porch of a horizontal sync pulse. The color burst frequency varies with the particular video standard implemented. In NTSC, for example, the color burst frequency is approximately 3.58 MHz; for PAL, the color burst frequency is approximately 4.43 MHz. In these composite video signals, the image color is determined by the phase relationship of a color subcarrier to the color burst. The color subcarrier is included in the active line portion of the composite video signal and conveys color information that is referenced to the color burst. The amplitude of the color subcarrier determines saturation, and the phase angle of the color subcarrier determines hue.

The complete set of color subcarrier data and color burst data are provided over a color frame sequence. The number of frames in the sequence may vary with the particular video standard implemented. In NTSC, for example, a two-frame sequence is used, and in PAL, a four-frame sequence is used.

The color frame sequence is based on the relationship between the color subcarrier frequency and the horizontal sync frequency of the video standard. In NTSC, for example, the color subcarrier is at 227.5×H, where H is the horizontal sync rate. Because a video frame contains an odd number of lines, this rate imposes a half cycle offset from video frame to video frame, and results in a color subcarrier to frame frequency ratio of 119,437.5:1. The half-cycle phase ambiguity at the start of a video frame must be resolved to insure that frames with different subcarrier phases are not mixed. A color frame identifier is used to correct this ambiguity by identifying the video frame sequences (e.g., odd and even for NTSC) that define a complete color frame.

Figure 1:
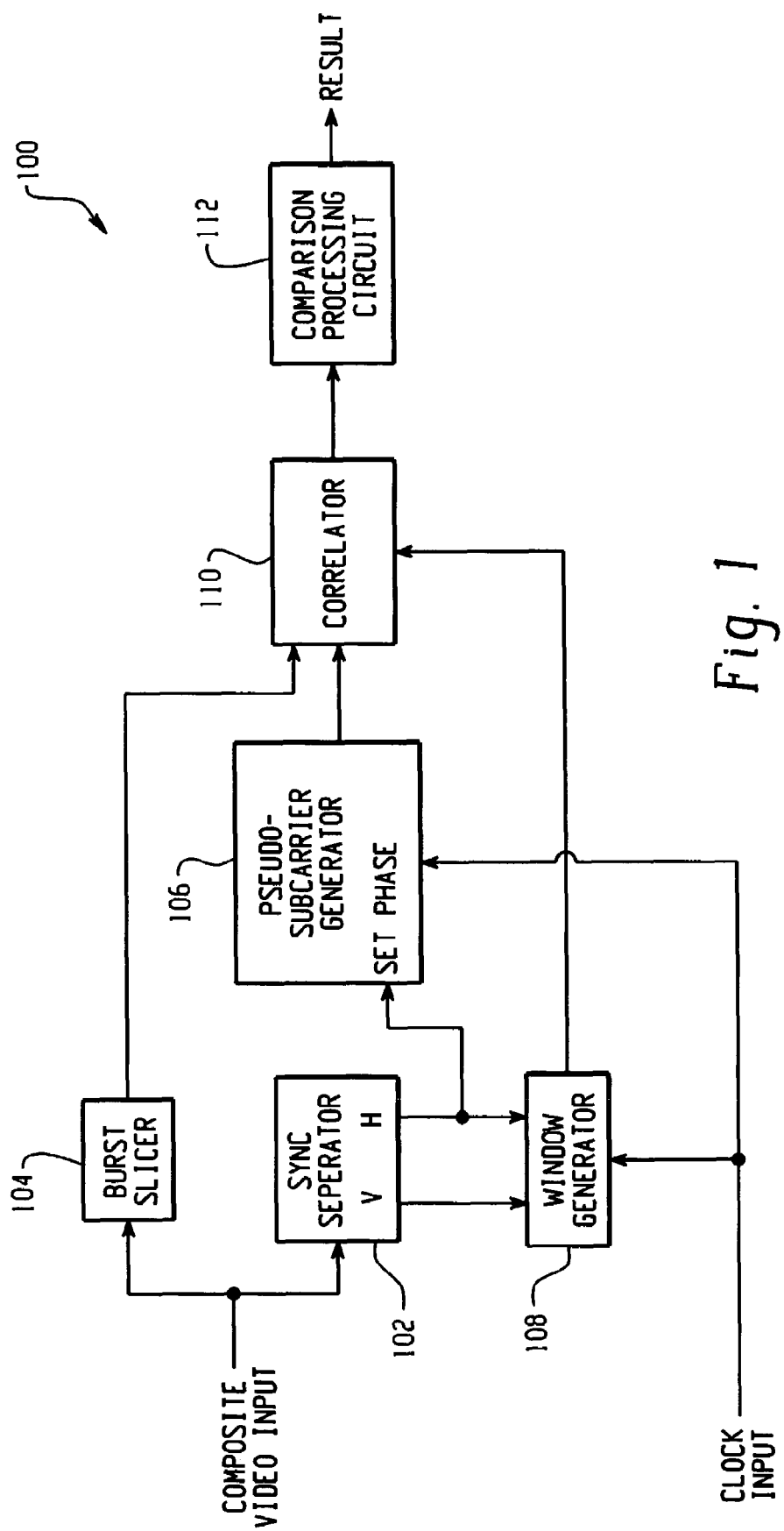
FIG. 1 is a block diagram of a color frame identifier circuit.

FIG. 1 is a block diagram of an example color frame identifier circuit 100. The color frame identifier circuit 100 generates a pseudo-subcarrier signal at a set phase relative to a horizontal sync pulse in a video line. The pseudo-subcarrier signal is compared to a sliced color burst of at least one selected line in a video frame over successive video frames. Because the pseudo-subcarrier signal has a set phase that is the same for each video frame and the color burst on a given video line changes phase in each successive frame, a comparison of the pseudo-subcarrier signal to the color burst on the given video line can be utilized to identify the color frame. Based on this comparison, a processing circuit determines if the color frame is odd or even.

In the example block diagram of FIG. 1, the color frame identifier circuit 100 includes a sync separator circuit 102, a burst slicer circuit 104, a pseudo-subcarrier generator circuit 106, a window generator circuit 108, a correlator circuit 110, and a comparison processing circuit 112. Each of the circuits may be realized using digital and/or analog circuit components. The color frame identifier circuit 100 generates a pseudo-subcarrier signal and compares the pseudo-subcarrier signal to a sliced color burst on at least one selected video line over successive video frames. Based on this comparison, a processing circuit 112 determines if the color frame is odd or even.

In operation, the color frame identifier circuit 100 receives a composite video signal and a reference clock as input. The composite video signal is provided to the sync separator 102 and the burst slicer 104. The sync separator 102 is configured to separate the horizontal sync pulses H and the vertical sync pulses V from the composite video signal. The sync separator 102 may, for example, slice the composite video signal at or near the half amplitude voltage of the synchronizing pulses to obtain a composite sync signal, and then utilize further digital processing to distinguish between the horizontal sync pulses H and the vertical sync pulses V.

The burst slicer 104 also receives the analog composite video signal and slices the color burst at a slice level to generate a corresponding digital signal representation of the color burst. In one embodiment, the burst slicer 104 has a slice level set between the video blanking level and ±150 mV for PAL video signals, or ±143 mV for NTSC video signals. A convenient slice level that accommodates both NTSC and PAL video formats is +70 mV. The exact slice level need not be at 50%, but should be set at a level that is high enough to avoid excessive noise when the color burst is not present, and low enough to slice the color burst reliably.

The pseudo-subcarrier generator 106 is likewise configured to generate a pseudo-subcarrier signal that is compared to the sliced burst signal generated by the burst slicer 104. The pseudo-subcarrier generator 106 is configured to receive the reference clock input and a first reference signal and generate the pseudo-subcarrier signal at a pseudo-subcarrier frequency based on the reference clock and at a set phase relative to the first reference signal. The pseudo-subcarrier generator 106 may comprise a counter, or a phase accumulator, depending on the ratio of the reference clock frequency to the subcarrier frequency. In one embodiment, the reference clock frequency is 27 MHz. However, any reference clock having a substantially greater frequency than the color burst frequency may be used. For example, with NTSC and PAL video signals, a reference clock having a frequency of 20 MHz or greater has been found to be satisfactory. The higher frequency of the reference clock insures that the pseudo-subcarrier signal may be implemented as a one-bit signal with sufficient phase accuracy.

In one embodiment, the pseudo-subcarrier generator 106 generates a pseudo-subcarrier signal set to a predefined phase relative to the horizontal sync signal received from the sync separator 102. Because the reference clock is not locked to the horizontal sync pulse, the predefined phase may have an ambiguity relative to a horizontal sync signal of up to half of a reference clock period. Accordingly, the phase ambiguity is inversely proportional to the frequency of the reference clock.

Because the color burst in the composite video signal changes phase on a given line of video in successive video frames, the color frame may be identified by interrogating only one line of video over successive video frames. Additional video lines may also be processed, however, to reduce the susceptibility to noise. Accordingly, in one embodiment, a window signal limits the processing of the color burst to one or more lines of video in successive frames. The window generator 108 receives the horizontal and vertical sync signals as input and determines the corresponding video line and frame for the composite video signal. Based on the video line and frame, the window generator 108 generates a window signal corresponding to the burst position in a selected video line in each video frame.

The correlator circuit 110 compares the sliced burst signal and the pseudo-subcarrier signal during the window period and generates a burst comparison value. Based on this burst comparison value, a processing circuit 112 determines if the color frame is odd or even.

Figure 2:
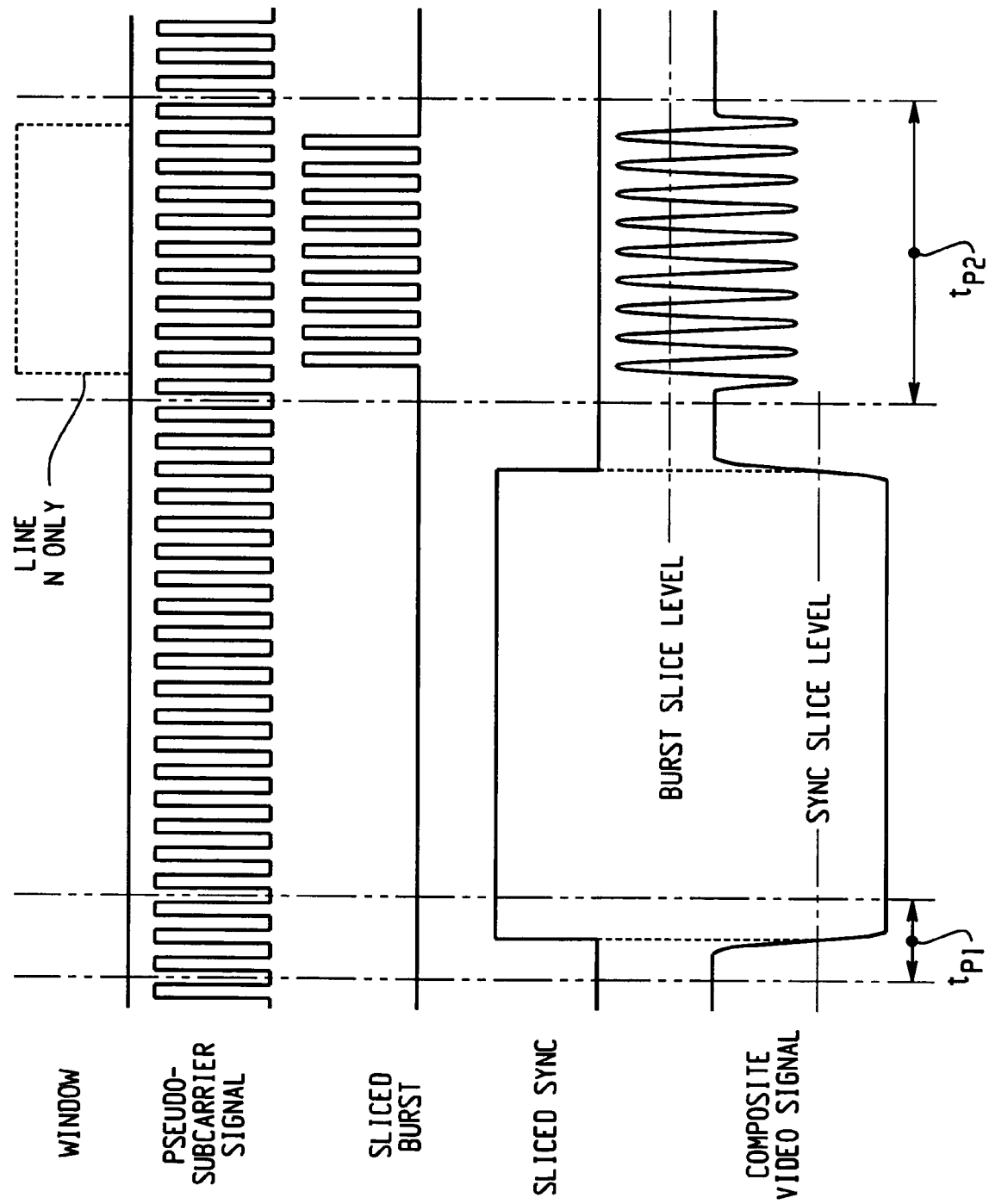
FIG. 2 is a detailed timing diagram showing a horizontal sync signal and a color burst.
Figure 3:
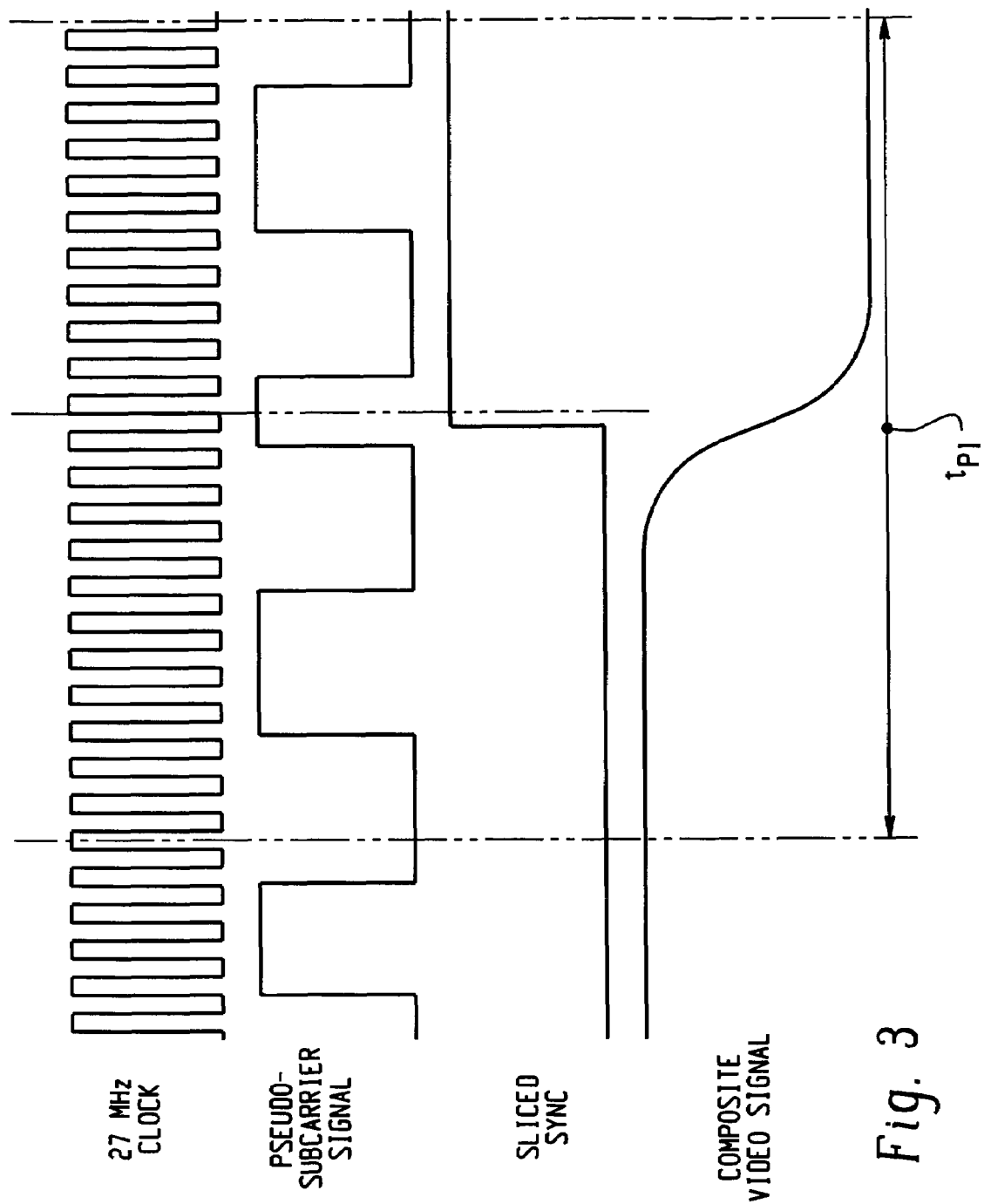
FIG. 3 is a more detailed timing diagram of a first time period of the timing diagram of FIG. 2.
Figure 4:
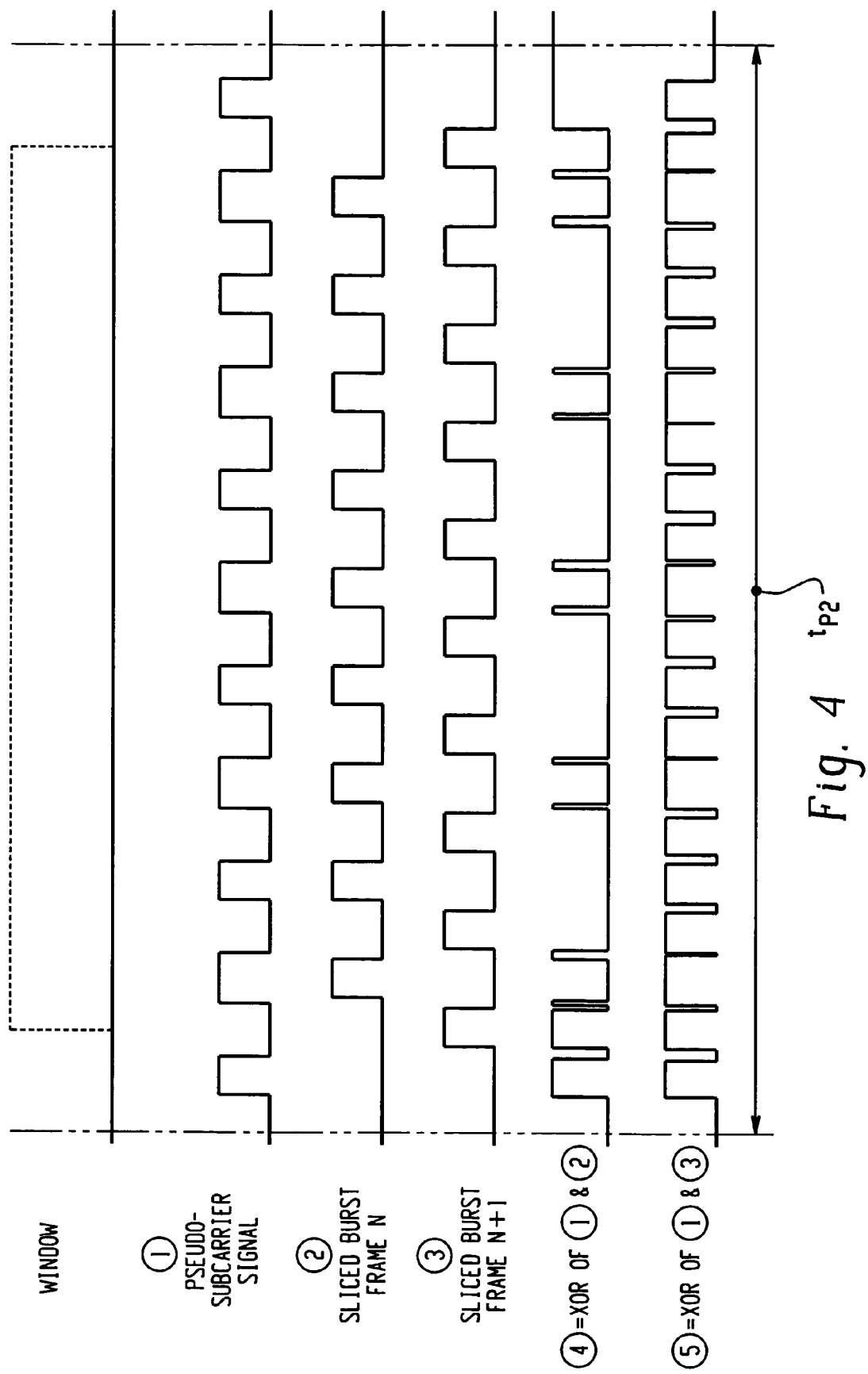
FIG. 4 is a more detailed timing diagram of a second time period of the timing diagram of FIG. 2.

Operation of the color frame identifier circuit 100 may be better understood with reference to FIGS. 2-4. FIG. 2 is a detailed timing diagram showing the composite video signal and corresponding output signals from the sync separator circuit 102, the burst slicer circuit 104, the pseudo-subcarrier generator circuit 106, and the window generator circuit 108. FIG. 3 is a more detailed timing diagram of a first time period $t_{p1}$ of the timing diagram of FIG. 2 illustrating the setting of the phase of the pseudo-subcarrier signal relative to a horizontal sync pulse. FIG. 4 is a more detailed timing diagram of a second time period $t_{p2}$ of the timing diagram of FIG. 2, and further includes a sliced burst signal for a line of video over two successive frames and the resulting comparisons of the sliced burst signals to the pseudo-subcarrier signal.

As shown in FIG. 2, the incoming composite video signal is sliced at a sync slice level by the sync separator circuit 102 to generate the sliced sync signal. Likewise, the burst slicer circuit 104 slices the color burst at a burst slice level to generate a sliced burst signal. In one embodiment, a 50% slicing level is used for the sync slice level and the burst slice level.

The window generator 108 generates a window signal for a particular line N in a video frame. Because the phase of the color burst for a particular line N in a video frame will vary for each successive video frame, the color frame may be identified by processing only one line of video in each video frame. The start time and duration of the window is selected so that the color burst is present during the window.

The pseudo-subcarrier signal does not have to be generated to a high level of precision because it is utilized only during the period defined by the window, which is proximate in time to the horizontal sync pulse. Thus, the pseudo-subcarrier signal need not match the actual color burst frequency, and instead can be generated at an approximate frequency by a digital circuit. For example, given a 27 MHz reference clock, and given that the PAL color subcarrier frequency is equal to 27 MHz divided by 6.0898, a divide-by-6 circuit, such as a three register ring oscillator, may be utilized to generate the pseudo-subcarrier signal for a PAL video format. In the case of NTSC, the subcarrier frequency is approximately equal to 27 MHz divided by 7.5428. The pseudo-subcarrier signal can thus be approximated by a divide-by-7.5 circuit, which may be realized by an eight-register ring oscillator.

If an approximation of the color burst carrier frequency is used, then the pseudo-subcarrier generator circuit 106 may be configured to generate the pseudo-subcarrier signal at a set phase relative to the horizontal sync signal. In the embodiment shown, the pseudo-subcarrier signal is reset to a set phase on the falling edge of the horizontal sync pulse during a first time period $t_{p1}$. In another embodiment, the pseudo-subcarrier signal may be reset to a set phase on the rising edge of the horizontal sync pulse.

FIG. 3 is a more detailed timing diagram of the first time period $t_{p1}$ of the timing diagram of FIG. 2. The pseudo-subcarrier generator circuit 106 is generating a pseudo-subcarrier signal having a first logic 1 state for three 27 MHz clock cycles, a second logic 0 state for four 27 MHz clock cycles, followed by a third logic 1 state for four 27 MHz clock cycles, and then followed by a fourth logic 0 state for four 27 MHz clock cycles. In the embodiment shown, the pseudo-subcarrier signal is to have a phase at which the second logic 0 state begins one full clock cycle after the detection of the rising edge of the sync pulse. Because the pseudo-subcarrier signal was set during a previous horizontal sync pulse, however, the pseudo-subcarrier signal may be out of phase with the horizontal sync pulse, as shown at the time preceding the horizontal sync pulse in FIG. 3. Accordingly, the first logic 1 state is truncated by a single 27 MHz clock cycle upon the detection of the horizontal sync pulse to bring the pseudo-subcarrier signal into proper phase with the horizontal sync pulse. The circuit of FIG. 1 is thus tolerant to a timing ambiguity if the reference clock or the pseudo-subcarrier signal is not phase locked to the video signal.

Setting the phase of the pseudo-subcarrier signal relative to the horizontal sync pulse facilitates the detection of the phase of the color burst for each successive line of video in a video frame. For example, in NTSC video signals, the phase for each color burst varies by 180 degrees for a given line in successive frames. Thus, the phase of the sliced burst signal will likewise vary by 180 degrees relative to the phase of the generated pseudo-subcarrier signal for that particular line in each video frame. This dynamic phase relationship is detected by the correlator circuit 110, which is configured to receive the sliced burst signal and the pseudo-subcarrier signal and generate a burst comparison value for each sliced burst signal.

The correlator circuit 110 compares the sliced burst signal and the pseudo-subcarrier signal during the window period that occurs during the second time period $t_{p2}$. FIG. 4 is a more detailed timing diagram of the second time period $t_{p2}$ of the timing diagram of FIG. 2, and further includes a sliced burst signal for a line of video over two successive frames. In the example embodiment described with reference to FIG. 4, the correlator circuit comprises an exclusive OR function (XOR) to compare the pseudo-subcarrier signal to the sliced burst signals.

The first signal timing data comprises the pseudo-subcarrier signal generated by the pseudo-subcarrier generator 106. The second and third signal timing data comprises the sliced burst signal corresponding to the color burst for a particular line of video over two successive video frames N and N+1. A successive video frame in the context of FIG. 4 is a video frame in which a color burst phase changes on a given line of video from a previous frame. In an NTSC video signal, for example, the color burst changes phase by 180 degrees for each successive frame. Accordingly, the sliced burst signals for the particular line of video over two successive video frames N and N+1 are likewise 180 degrees out of phase.

The pseudo-subcarrier signal generated by the pseudo-subcarrier generator 106, however, maintains the same phase for each line of video as its phase is set relative to the horizontal sync pulse. Thus, the phase of the pseudo-subcarrier signal is more closely matched to the phase of the sliced burst signal of the video frame N than it is to the phase of the sliced burst signal of the video frame N+1. The pseudo-subcarrier signal is compared to the sliced burst signals by an XOR operation, and the result is accumulated during the window period. As illustrated in FIG. 4, the XOR of the pseudo-subcarrier signal and the sliced burst signal for frame N has fewer logic 1 values than the XOR of the pseudo-subcarrier signal and the sliced burst signal for frame N+1. The results of the XOR operations may be accumulated as a burst comparison value and compared with a value table to determine the color frame of the composite video signal.

The accumulation may be implemented by counting the number of logic 1 values output by the XOR operations during the window, by integrating the output of the XOR operations, or by some other operation. The system may be designed to correlate lower burst comparison values to an odd frame, and higher burst comparison values to an even frame.

The burst comparison values for correlation of the pseudo-subcarrier signal and the sliced burst signal will thus alternate between high and low values for NTSC, with the low values relating to the odd video frames in the color frame sequence. For a PAL video signal, a "high, high, low, low" sequence of burst comparison values will be detected, with the second of the "low" burst comparison values in the sequence representing the first video frame in the color frame sequence. The set phase of the pseudo-subcarrier signal can be modified to likewise modify the sequence described above.

In the example embodiment of FIG. 4, a single line of video per video frame is selected, and the correct phase of the subcarrier burst for that line according to the definition of the PAL or NTSC subcarrier is calculated. Any line with a color burst present may be selected over successive video frames. In one embodiment, the line that occurs during or near to vertical blanking is selected to minimize interference from the picture information. In one embodiment, the selected line number is 20 for NTSC and 25 for PAL.

Figure 5:
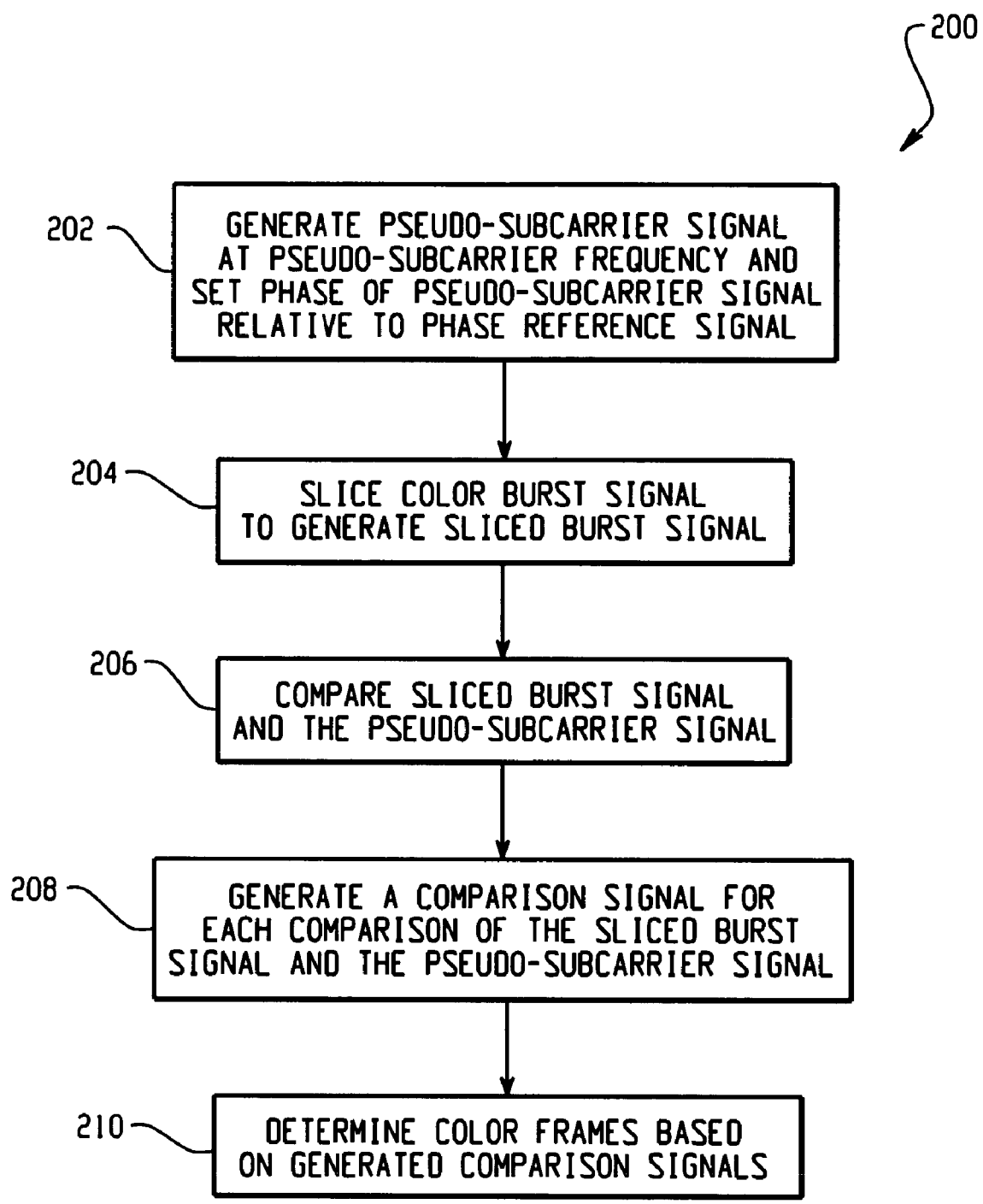
FIG. 5 is a flow diagram of a method for processing a video signal.

FIG. 5 is a flow diagram 200 of a method for processing a video signal. In step 202, a pseudo-subcarrier signal at an approximate subcarrier frequency and at a set phase relative to a reference signal is generated. In one embodiment, the reference signal is a horizontal sync pulse. In step 204, the color burst signal is sliced to generate a sliced burst signal. In step 206, the sliced burst signal is compared to the pseudo-subcarrier signal, and a comparison signal is generated for each comparison in step 208. Steps 202, 204, 206, and 208 may be repeated for successive video frames. In step 210, the color frame is determined based on the comparison signals generated in step 208.

The systems and methods described herein provide for color frame identification for composite (e.g., NTSC or PAL) signals using an arbitrary clock frequency. There is no requirement for frequency or phase locking of the clock to the video signal. The systems and methods described herein may be implemented using a low cost comparator for color burst slicing and a sampling frequency that need not match or be an exact multiple of the color subcarrier frequency. The systems and methods are tolerant of imprecise measurements, and need only determine the color burst phase to an accuracy of ±45 degrees.

Variations of the systems and methods described herein may also be implemented. For example, in another embodiment, the set phase of the pseudo-subcarrier signal may be changed relative to each line of video and the results accumulated over successive frames. The sampling of every video line over successive frames yields more accurate results and is more tolerant to noise. Additionally, other video formats having other color frame specifications may also be accommodated.

In another example embodiment, the pseudo-subcarrier generator may comprise a local oscillator that is operable to be reset upon receiving a sync pulse input. The local oscillator output may be utilized instead of a reference clock. The local oscillator may generate a signal at a substantially higher frequency than the frequency of the color burst. Alternatively, the local oscillator may generate a frequency that is approximately equal to the color burst, and may be adjustable for different video standards.

The above-described embodiments of the invention are intended to be examples only. Those of skill in the art may effect alterations, modifications and variations to the particular embodiments without departing from the scope of the invention.

What is claimed is:

1. A color frame identifier circuit, comprising:
a pseudo-subcarrier generator circuit configured to receive a reference clock and a first reference signal and generate a pseudo-subcarrier signal at a pseudo-subcarrier frequency based on the reference clock and at a set phase relative to the first reference signal;
a color burst slicer circuit configured to slice a color burst signal of a composite video signal at a reference voltage and generate a sliced burst signal;
a correlation circuit configured to receive the sliced burst signal and the pseudo-subcarrier signal and generate a burst comparison value for each sliced burst signal; and
a processing circuit configured to receive the burst comparison value for each sliced burst signal and generate a color frame identifier signal based on the sliced burst signals;
wherein the first reference signal comprises a horizontal sync pulse of a composite video signal comprising a plurality of lines defining a video frame, and the pseudo-subcarrier generator circuit generates the pseudo-subcarrier signal at the set phase relative to the horizontal sync pulse.

2. The color frame identifier circuit of claim 1, further comprising:
a window generator circuit configured to receive the reference clock and the first reference signal and generate a window signal relative to the first reference signal.

3. The color frame identifier circuit of claim 2, wherein the window generator circuit is further configured to receive a second reference signal and generate the window signal additionally relative to the second reference signal.

4. The color frame identifier circuit of claim 3, wherein the first reference signal comprises a horizontal sync pulse of a composite video signal comprising a plurality of lines that define a video frame, and the second reference signal comprises a vertical sync pulse of the composite video signal.

5. The color frame identifier circuit of claim 4, wherein the window generator is further configured to generate the window signal for at least one selected line in each video frame.

6. The color frame identifier circuit of claim 5, wherein the composite video signal comprises an NTSC television signal.

7. The color frame identifier circuit of claim 5, wherein the composite video signal comprises a PAL television signal.

8. The color frame identifier circuit of claim 1, wherein the pseudo-subcarrier generator circuit is further configured to select the pseudo-subcarrier frequency by setting the pseudo-subcarrier frequency to an approximate frequency of the color burst signal.

9. The color frame identifier circuit of claim 8, wherein the pseudo-subcarrier generator circuit comprises a ring oscillator.

10. The color frame identifier circuit of claim 1, wherein the correlation circuit comprises an exclusive OR gate configured to receive the pseudo-subcarrier signal and the sliced burst signal as input.

11. The color frame identifier circuit of claim 10, wherein the correlation circuit further comprises an accumulator configured to receive the output of the exclusive OR gate and generate a corresponding output.

12. The color frame identifier circuit of claim 1, wherein the pseudo-subcarrier generator circuit generates the pseudo-subcarrier signal at the set phase relative to the horizontal sync pulse by selecting a first set phase a first line in the video frame and a second set phase for a second line in the video frame.

13. The color frame identifier circuit of claim 4, wherein the pseudo-subcarrier generator circuit generates the pseudo-subcarrier signal at the set phase relative to the horizontal sync pulse by selecting a first set phase for a first line in the video frame and a second set phase for a second line in the video frame.

14. The color frame identifier circuit of claim 1, wherein the reference clock is a 27 MHz reference clock.

15. A method of processing a television video signal, comprising:
generating a pseudo-subcarrier signal at a pseudo-subcarrier frequency based on a reference clock and at a set phase relative to a first reference signal in the video signal;
slicing a color burst signal of the television video signal to generate a sliced burst signal;
comparing the sliced burst signal and the pseudo-subcarrier signal;
generating a comparison signal for each comparison of the sliced burst signal and the pseudo-subcarrier signal; and
generating a color frame identifier signal based on the generated comparison signals;
wherein generating a pseudo-subcarrier signal at a pseudo-subcarrier frequency based on a reference clock and at a set phase relative to a first reference signal in the video signal comprises:
setting the pseudo-subcarrier signal at a first set phase a first line in the video frame relative to the first reference signal: and
setting the pseudo-subcarrier signal at a second set phase for a second line in the video frame relative to the first reference signal;
wherein the first reference signal comprises a horizontal sync pulse.

16. The method of claim 15, further comprising:
generating a window signal relative to the first reference signal; and
comparing the sliced burst signal and the pseudo-subcarrier signal only during the window signal.

17. The method of claim 16, wherein generating a window signal relative to the first reference signal comprises generating the window signal for a selected line in a video frame for each successive video frame.

18. A color frame identifier circuit, comprising:
means for generating a pseudo-subcarrier signal at a pseudo-subcarrier frequency based on a reference clock and at a set phase relative to a first reference signal in the video signal;
means for slicing a color burst signal of the television video signal to generate a sliced burst signal;
means for comparing the sliced burst signal and the pseudo-subcarrier signal;
means for generating a comparison signal for each comparison of the sliced burst signal and the pseudo-subcarrier signal; and
means for generating a color frame identifier signal based on the generated comparison signals;

wherein the means for generating a pseudo-subcarrier signal at a pseudo-subcarrier frequency based on a reference clock and at a set phase relative to a first reference signal in the video signal comprises:
means for setting the pseudo-subcarrier signal at a first set phase a first line in the video frame relative to the first reference signal; and
means for setting the pseudo-subcarrier signal at a second set phase for a second line in the video frame relative to the first reference signal;

wherein the first reference signal comprises a horizontal sync pulse.

19. The color frame identifier circuit of claim 18, further comprising:
means for generating a window signal relative to the first reference signal.

* * * * *